United States Patent
Shang et al.

(10) Patent No.: US 11,287,997 B2
(45) Date of Patent: Mar. 29, 2022

(54) METHOD, ELECTRONIC DEVICE AND COMPUTER PROGRAM PRODUCT FOR MANAGING DISK ARRAY

(71) Applicant: EMC IP Holding Company LLC, Hopkinton, MA (US)

(72) Inventors: Rongrong Shang, Beijing (CN); Haiying Tang, Beijing (CN); Xiaobo Zhang, Beijing (CN); Jian Gao, Beijing (CN); Zhilong Wu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 16/877,881

(22) Filed: May 19, 2020

(65) Prior Publication Data

US 2021/0132843 A1 May 6, 2021

(30) Foreign Application Priority Data

Oct. 30, 2019 (CN) .......................... 201911047042.X

(51) Int. Cl.
*G06F 3/06* (2006.01)
(52) U.S. Cl.
CPC .......... *G06F 3/0644* (2013.01); *G06F 3/0604* (2013.01); *G06F 3/0689* (2013.01)
(58) Field of Classification Search
CPC ..... G06F 3/0644; G06F 3/0604; G06F 3/0689
See application file for complete search history.

(56) References Cited

U.S. PATENT DOCUMENTS

| | | | |
|---|---|---|---|
| 9,367,395 B1 | 6/2016 | Bono et al. | |
| 9,558,068 B1 | 1/2017 | Bono et al. | |
| 10,019,168 B2 | 7/2018 | Shapiro et al. | |
| 10,534,674 B1 | 1/2020 | Karmarkar et al. | |
| 10,678,643 B1* | 6/2020 | Gao | G06F 3/065 |
| 10,776,317 B1 | 9/2020 | Veeraswamy et al. | |
| 11,016,939 B2 | 5/2021 | Lu et al. | |
| 11,023,147 B2 | 6/2021 | Shang et al. | |
| 11,061,770 B1 | 7/2021 | Patel et al. | |
| 11,099,940 B1 | 8/2021 | Patel et al. | |
| 11,113,146 B2 | 9/2021 | Danilov et al. | |
| 2003/0188097 A1* | 10/2003 | Holland | G06F 11/1076 711/114 |

(Continued)

*Primary Examiner* — Ryan Bertram
(74) *Attorney, Agent, or Firm* — BainwoodHuang

(57) ABSTRACT

Techniques involve determining a stripe width of an array and metadata of candidate disks available for allocating a new array, the metadata indicating a total slice number in each of the candidate disks and a number of used slices in the candidate disks. The techniques further involve determining, based on the width and the total slice number, a first number of slices in the candidate disks that are available. The techniques further involve determining, based on the number of the used slices, a second slice number in the used slices that are available; and determining, based on the first number and the second number, utilization rates of the candidate disks for the allocation for the new array. Such techniques may make the utilization rates of the candidate disks more accurate, which ensures uniform use of the respective candidate disks and improves the performance of the candidate disks.

18 Claims, 5 Drawing Sheets

(56) References Cited

U.S. PATENT DOCUMENTS

| | | | | |
|---|---|---|---|---|
| 2005/0102551 A1* | 5/2005 | Watanabe | ............ | G06F 3/0607 |
| | | | | 714/6.2 |
| 2019/0129797 A1* | 5/2019 | Ma | ..................... | G06F 3/061 |
| 2019/0220231 A1* | 7/2019 | Xu | .................... | G06F 3/0647 |
| 2021/0132845 A1* | 5/2021 | Shang | ................. | G06F 3/0604 |

* cited by examiner

METHOD, ELECTRONIC DEVICE AND COMPUTER PROGRAM PRODUCT FOR MANAGING DISK ARRAY

CROSS-REFERENCE TO RELATED APPLICATION

This application claims priority to Chinese Patent Application No. CN201911047042.X, on file at the China National Intellectual Property Administration (CNIPA), having a filing date of Oct. 30, 2019, and having "METHOD, ELECTRONIC DEVICE AND COMPUTER PROGRAM PRODUCT FOR MANAGING DISK ARRAY" as a title, the contents and teachings of which are herein incorporated by reference in their entirety.

FIELD

Embodiments of the present disclosure generally relate to the field of data storage, and more specifically, to method, electronic device and computer program product for managing disk arrays.

BACKGROUND

As storage technology develops, users are increasingly using disk arrays for data storage. A disk array is comprised of a plurality of independent disks. The disk array, for example, may be Redundant Array of Independent Disks (RAID) or a group of disks having other suitable structures/forms. For users, the disk array is just like a disk, but with stronger storage capacity than the single hard disk and featured with data backup. Different combinations of disk arrays are known as RAID Level, e.g., RAID0, RAID1, RAID 5 and the like.

Data read and write now are executed on the disk slice level instead of the disk level because of the development of RAID technology. Based on this technology, each disk in a plurality of disks is divided into a plurality of physical disk slices and the RAID is created by the physical disk slices. Therefore, it is usually required to allocate physical disk slices in a limited number of disks to the RAID and the limited number of disks are often referred to as RAID Resilience Set (RRS). However, many issues need be addressed when the disk array is comprised of physical disk slices in the RRS.

SUMMARY

Embodiments of the present disclosure provide method, electronic device and computer program product for managing disk arrays.

According to a first aspect of the present disclosure, there is provided a method of managing disk arrays. The method includes determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks. The method also includes determining, based on the width of the stripe and the total number, a first number of physical disk slices in the candidate disks that are available as disk slices of the set of disk arrays. The method further includes determining, based on the number of the used physical disk slices, a second number of physical disk slices in the used physical disk slices that are available as disk slices of the set of disk arrays; and determining, based on the first number and the second number, utilization rates of the candidate disks for the allocation for the new disk array.

According to a second aspect of the present disclosure, there is provided an electronic device. The electronic device includes a processor and a memory storing computer program instructions, the processor running the computer program instructions in the memory to control the electronic device to perform acts consisting: determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks; determining, based on the width of the stripe and the total number, a first number of physical disk slices in the candidate disks that are available as disk slices of the set of disk arrays; determining, based on the number of the used physical disk slices, a second number of physical disk slices in the used physical disk slices that are available as disk slices of the set of disk arrays; and determining, based on the first number and the second number, utilization rates of the candidate disks for the allocation for the new disk array.

According to a third aspect of the present disclosure, there is provided a computer program product being tangibly stored on a non-volatile computer-readable medium and including machine-executable instructions which, when executed, cause a machine to perform steps of the method according to the first aspect of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding reference signs indicate same or corresponding parts.

DETAILED DESCRIPTION OF EMBODIMENTS

Figure 1:
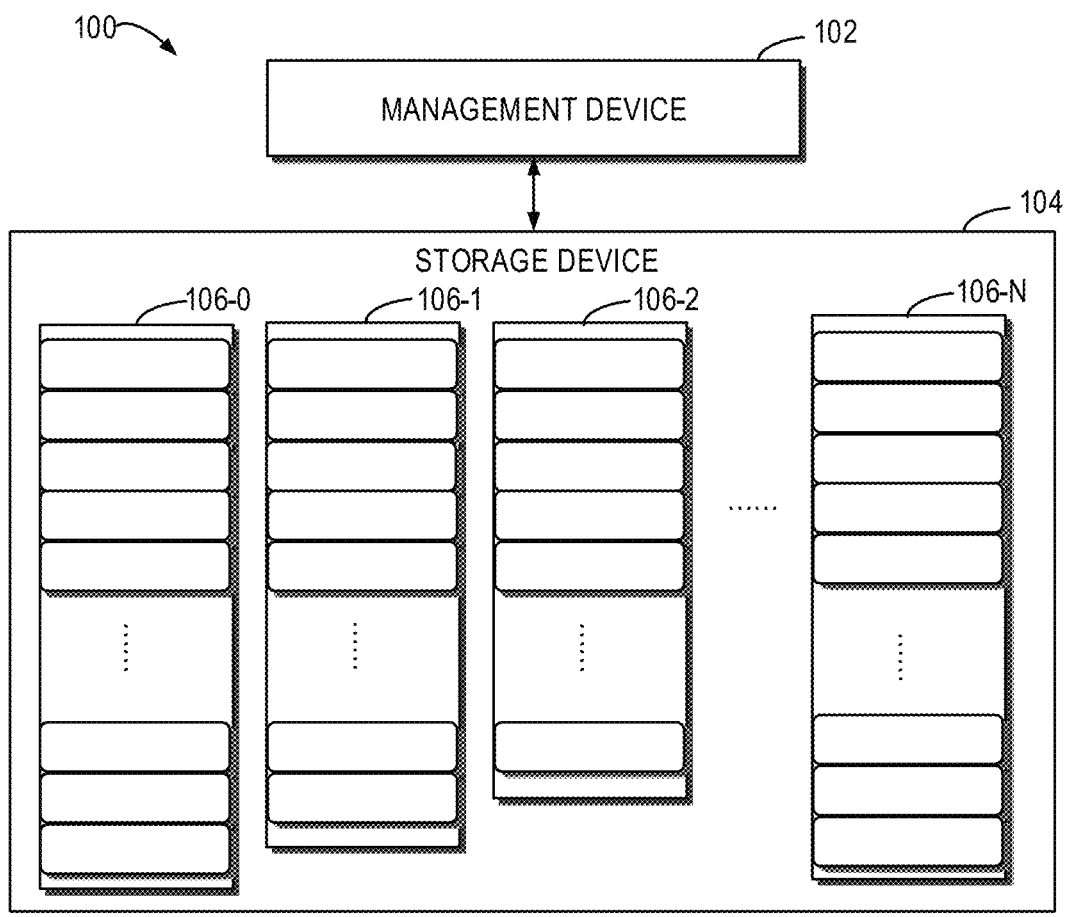
FIG. 1 illustrates a schematic diagram of an example environment 100 where device and/or method in accordance with embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail with reference to the drawings. Although the drawings illustrate some embodiments of the present disclosure, it should be appreciated that the present disclosure can be implemented in various manners and should not be limited to the embodiments explained herein. On the contrary, the embodiments are provided to understand the present disclosure in a more thorough and complete way. It should be appreciated that drawings and embodiments of the present disclosure are only by way of example rather than restricting the protection scope of the present disclosure.

In the descriptions of the embodiments of the present disclosure, the term "includes" and its variants are to be read as open-ended terms that mean "includes, but is not limited to." The term "based on" is to be read as "based at least in part on." The terms "one embodiment" and "this embodiment" are to be read as "at least one embodiment." The terms "first", "second" and so on can refer to same or different objects. The following text also can include other explicit and implicit definitions.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

A storage device usually includes a plurality of disks, which are allocated to different sets of disks (e.g., RRS) based on device type and the number of disks. Accordingly, the storage device may include at least one set of disks. Physical disk slices from the set of disks may form a disk array and a plurality of disk arrays may constitute a set of disk arrays, in which the disk arrays have the same width of stripe. The width of the stripe of a disk array refers to the number of disks occupied by a stripe of the disk array. The width of the stripe of the disk array may be used as the width of the disk array. Therefore, the width of the disk array and the width of stripe of the disk array may be used interchangeably.

When a new disk array is allocated to the disk array set from the set of disks, it is usually required to determine utilization rates of a respective set of disks. At this moment, disks in the set of disks serve as candidate disks for allocating a new disk array to the set of disk arrays. However, in traditional solutions, the utilization rate of the set of disks is identical for any set of disk arrays. For example, the utilization rate of the set of disks is identical for the disk array set in which a width of a stripe of the disk array is 5 and for the disk array set in which a width of a stripe of the disk array is 2.

However, the set of disks often contains some candidate disks with different capacities, so the number of available disks slices may differ with respect to sets of disk arrays having different widths of stripe. In the case that a new disk array is allocated to different sets of disk arrays using the set of disks, if the allocation is performed based on the same utilization rate, it is possible that some candidate disks are allocated with excessive physical disk slices for data storage while some are allocated with fewer physical disk slices for data storage. As a result, the overall performance of the disk array decreases.

To address the above problem, the present disclosure provides a method of managing disk arrays. In the method, a width of a stripe of a disk array in a set of disk arrays and metadata of candidate disks available for allocating a new disk array to the set of disk arrays are determined in the first place. Then, a first number of physical disk slices in the candidate disks that are available as disk slices of the set of disk arrays is determined based on the width of the stripe and the total number. A second number of physical disk slices in the used physical disk slices that are available as disk slices of the set of disk arrays is further determined according to the number of used physical disk slices. At last, utilization rates of the candidate disks are determined based on the first number and the second number for allocating the new disk array to the set of disk arrays. Utilization rates of the candidate disks with respect to different sets of disk arrays can be determined. Therefore, since the utilization rates of the candidate disks with respect to different disk array sets are calculated, the utilization rates will become more accurate, which further ensures uniform use of the candidate disks and improves the overall performance of the candidate disks.

FIG. 1 illustrates a schematic diagram of an example environment 100 (e.g., a data storage system) where device and/or method in accordance with embodiments of the present disclosure can be implemented.

As shown, the example environment 100 includes a management device 102 and a storage device 104, wherein the management device 102 is provided for allocating a new disk array to the set of disk arrays from the storage device 104.

As a storage medium for storing large volumes of data, the storage device 104 may include various volatile and/or non-volatile data storage media. Examples of the storage media may include, but not limited to, magnetic disk, optical disk, hard disk, Solid-State Disk (SSD) and cache. Alternatively or additionally, the storage device 104 may include the same type of storage medias and also may contain different types of storage media.

The storage device 104 in FIG. 1 includes a plurality of candidate disks 106-0, 106-1, 106-2 . . . 106-N, where N is a positive integer. Candidate disks in the storage device 104 may be allocated to at least one set of disks based on the disk type. Each candidate disk in the storage device 104 is segmented into a plurality of physical disk slices and each physical disk slice is of the same size. The number of physical disk slices on each candidate disk may be identical or different and the size of the physical disk slice may be set as required. In some embodiments, the physical disk slice, for example, is 4 GB.

In the storage device 104, the same type of candidate disks may be allocated into the same set of disks. In some embodiments, the number of candidate disks in the set of disks does not exceed 25. Different types of candidate disks are allocated into different sets of disks.

Physical disk slices in the storage device 104 form a disk array and disk arrays in the set of disk arrays have the same level. Disk arrays in the set of disk arrays include, but not limited to, RAID 0, RAID 1, RAID 0+1, RAID 2, RAID 3, RAID 4, RAID 5, RAID 7 and RAID 10 etc.

The management device 102 receives, from users or upper-layer applications, a request for allocating a new disk array to a set of disk arrays, the request including an identification of the set of disk arrays. Then, the management device 102 obtains metadata of the set of disk arrays based on the identification of the set of disk arrays. In some embodiments, the management device 102 obtains, from the storage device 104, metadata for the set of disk arrays. In some embodiments, the metadata for the set of disk arrays is stored in the management device 102. In some further embodiments, the management device 102 obtains the metadata for the set of disk arrays from other devices. The above examples are provided merely for describing the present disclosure, rather than restricting it. Those skilled in the art may obtain the metadata from any suitable devices as required.

The management device 102 may determine, via the obtained metadata of the set of disk arrays, device type of the set of disk arrays, such as disk type. The management device 102 also obtains, from the storage device 104, metadata of at least one set of disks and the device type of the set of disks is further obtained from the metadata of the set of disks. Afterwards, the management device 102 compares the device type of the set of disk arrays with the device type of the at least one set of disks to determine which disk sets are available for allocating a new disk array to the set of disk arrays.

Upon determining the utilization rate of one set of disks, the management device 102 calculates the utilization rate of the set of disks with respect to the set of disk arrays based on the number of physical disk slices in the set of disks available for the disk array set and the number of used physical disk slices in the set of disks. Then, the set of disks whose utilization rate is below a utilization rate threshold is employed for allocating a new disk array. For example, the set of disks with the minimum utilization rate is used for allocating a new disk array.

A schematic diagram of the environment 100 where device and/or method in accordance with embodiments of the present disclosure can be implemented has been described above with reference to FIG. 1. Next, a method 200 of managing disk arrays in accordance with embodiments of the present disclosure is described with reference to FIG. 2, wherein the method 200 may be executed at the management device 102 of FIG. 1 or at any other suitable devices.

At 202, the management device 102 determines a width of a stripe of a disk array in the set of disk arrays and metadata of candidate disks available for allocating a new disk array to the set of disk arrays, the metadata indicating the total number of physical disk slices in each of the candidate disks and the number of used physical disk slices in the candidate disks. The metadata includes the number of physical disk slices of each of the candidate disks. In some embodiments, the number of used physical disk slices includes the number of physical disk slices used by each of different sets of disk arrays. In some embodiments, the number of used physical disk slices is the number of physical disk slices used by all set of disk arrays.

In some embodiments, the management device 102 receives, from users or upper-layer applications, a request for allocating a new disk array to the set of disk arrays, wherein the request includes an identification of the set of disk arrays. Then, the management device 102 obtains the metadata of the set of disk arrays based on the identification. The metadata of the set of disk arrays contains a first device type corresponding to the set of disk arrays.

The management device 102 also obtains metadata of the set of disks. To facilitate description, the set of disks is referred to as candidate disks. The metadata of the candidate disks also contains a second device type related to the candidate disks. The management device 102 matches the first device type with the second device type. If they match, the management device 102 determines a width of a stripe and then calculates the utilization rate of the candidate disk. If not, this candidate disk is not used for allocating a new disk array to the set of disk arrays.

At 204, the management device 102 determines, based on the width of the stripe and the total number, a first number of physical disk slices in the candidate disks that are available as disk slices of the set of disk arrays. After obtaining the width of the stripe width and the total number of physical disk slices in each of the candidate disks, the management device 102 may determine the total number of physical disk slices in the candidate disks available for the set of disk arrays.

In some embodiments, the management device 102 sorts the candidate disks based on the total number of physical disk slices in each candidate disk. For example, the candidate disks are sorted in a descending order by the number of physical disk slices. The management device 102 determines, based on the width of the stripe, a first number of physical disk slices in the sorted candidate disks that are available as disk slices of the set of disk arrays.

In some embodiments, upon determining the first number, the management device 102 divides, based on the width of the stripe, the candidate disks into two parts, wherein the number of candidate disks in the first part is the stripe width plus 1, i.e., including disks for allocating disk arrays to the set of disk arrays as well as a preserved disk for storing data on other disks in case they are broken.

Last disk in the first part, i.e., the disk with minimum number of physical disk slices is available as the preserved disk, and the number of physical disk slices available for the set of disk arrays in each of the other candidate disks is identical to the number of disk slices in the last disk. Physical disk slices in the preserved disk do not serve as disk slices of the set of disk arrays. For example, given a stripe width of 5, the first 6 disks selected respectively have 10, 10, 10, 6, 6 and 6 disk slices. Accordingly, the number of physical disk slices in each disk available for the set of disk arrays is 6. The physical disk slices on the sixth disk do not act as disk slices of the disk array set because the sixth disk is a reserved disk. In addition, the first, second and third disks respectively have 4 physical disk slices unavailable for the set of disk arrays.

However, physical disk slices in the second part all serve as disk slices of the set of disk array. Therefore, the first number of physical disk slices in the sorted candidate disks that are available as the disk slices of the set of disk arrays may be determined.

At 206, the management device 102 determines, based on the number of used physical disk slices, a second number of physical disk slices in the used physical disk slices that are available as the disk slices of the set of disk array. The management device 102 may determine the second number of physical disk slices in the used physical disk slices that are available as the disk slices of the set of disk arrays according to the number of used physical disk slices. A detailed procedure of determining the second number by the management device 102 is described below with reference to FIGS. 3 and 4.

At 208, the management device 102 determines, based the first number and the second number, the utilization rate of the candidate disks for the allocation for the new disk array.

In some embodiments, the management device 102 divides the second number by the first number to determine the utilization rate of the candidate disks. The above examples are provided merely for describing the present disclosure, rather than restricting it. Those skilled in the art may determine the utilization rate in any suitable way on the basis of the first number and the second number.

If the utilization rate of the candidate disk determined by the management device 102 is lower than a threshold utilization rate, an indication for allocating a new disk array to the set of disk array in the candidate disk is sent to the storage device 104 to allocate the new disk array.

In some embodiments, the management device 102 also may determine the utilization rates of other candidate disks with respect to the set of disk arrays. Then, the management device 102 compares a plurality of utilization rates and determines a candidate disk with the minimum utilization rate as a target candidate disk for allocating new disk arrays.

The utilization rates of the candidate disks with respect to different disk array sets may be determined through the above method. Therefore, the utilization rates of the candidate disks with respect to different disk array sets become more accurate, which further ensures uniform use of the candidate disks and improves the overall performance of the candidate disks.

Figure 2:
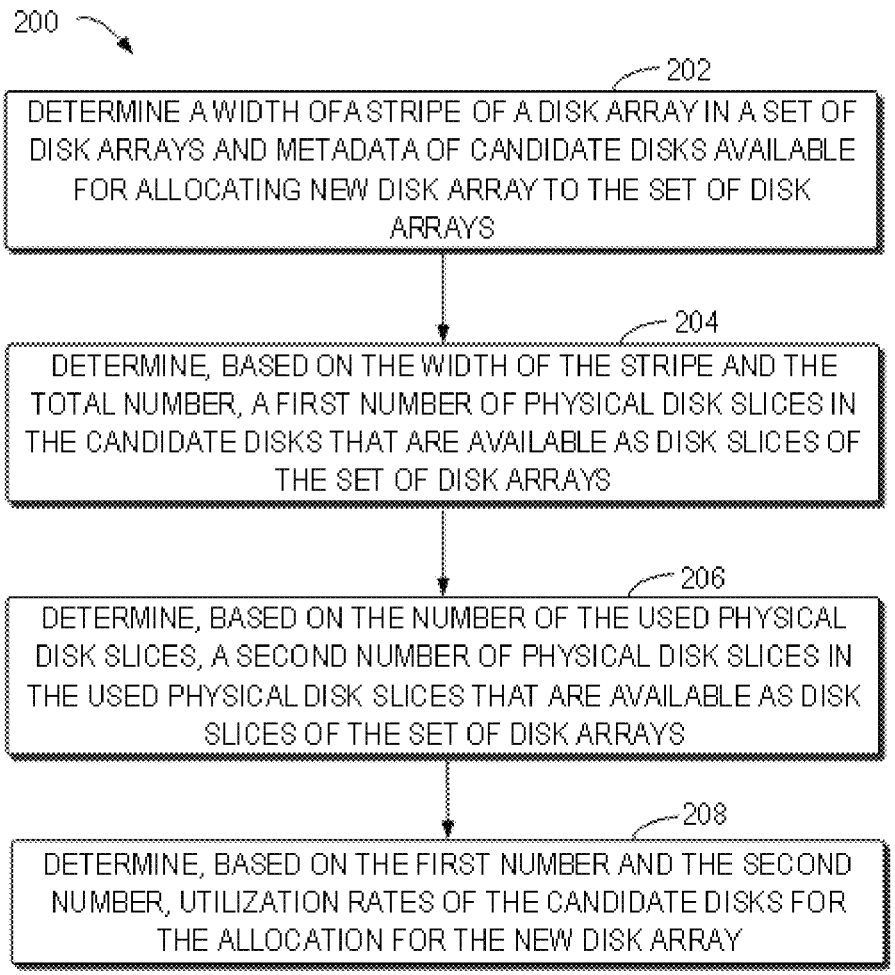
FIG. 2 illustrates a flowchart of a method 200 for managing disk arrays in accordance with embodiments of the present disclosure.
Figure 3:
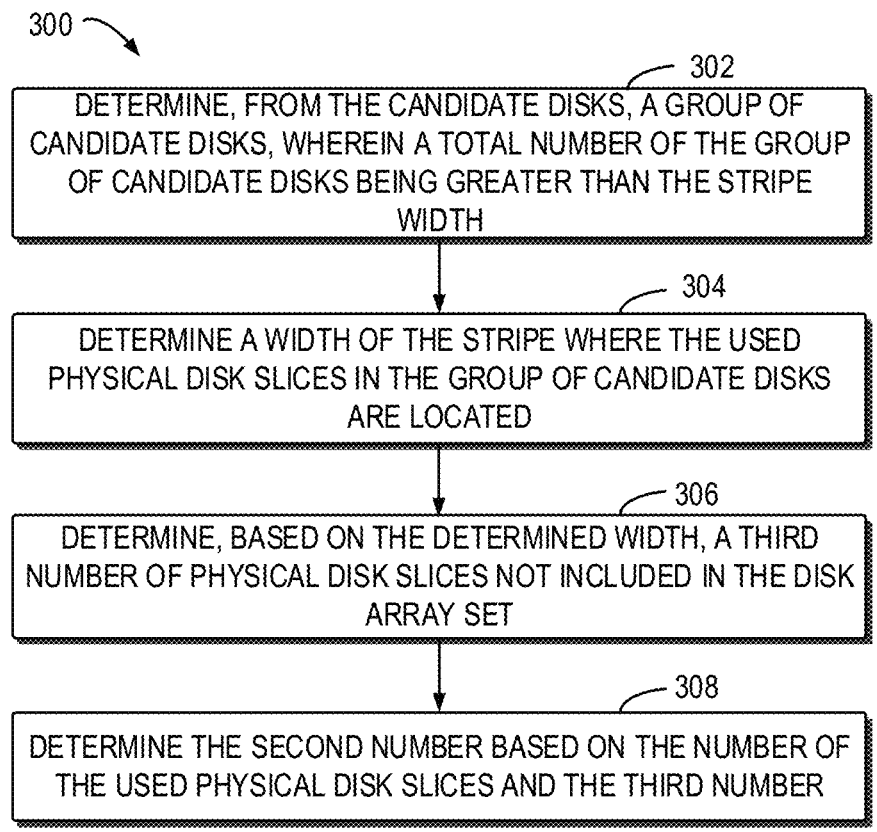
FIG. 3 illustrates a flowchart of a method 300 for determining a second number of physical disk slices that are available as disk slices of the set of disk arrays in accordance with embodiments of the present disclosure.

The above FIG. 2 has illustrated a schematic diagram of the method 200 of managing the disk array in accordance with embodiments of the present disclosure and the operation at 206 of FIG. 2 is described below with reference to FIGS. 3 and 4. FIG. 3 illustrates a flowchart of a method 300 for determining a second number of physical disk slices that are available as disk slices of the set of disk arrays in accordance with embodiments of the present disclosure. The method 300 in FIG. 3 may be executed by the management device 102 in FIG. 1 or any other suitable devices.

At 302, the management device 102 determines from the candidate disks a group of candidate disks. The total number of the group of candidate disks is greater than the width of the stripe. The management device 102 sorts the candidate disks and then selects, from the sorted candidate disks, first N candidate disks with relatively more physical disk slices, where N is the width of the set of disk arrays plus 1.

Figure 4:
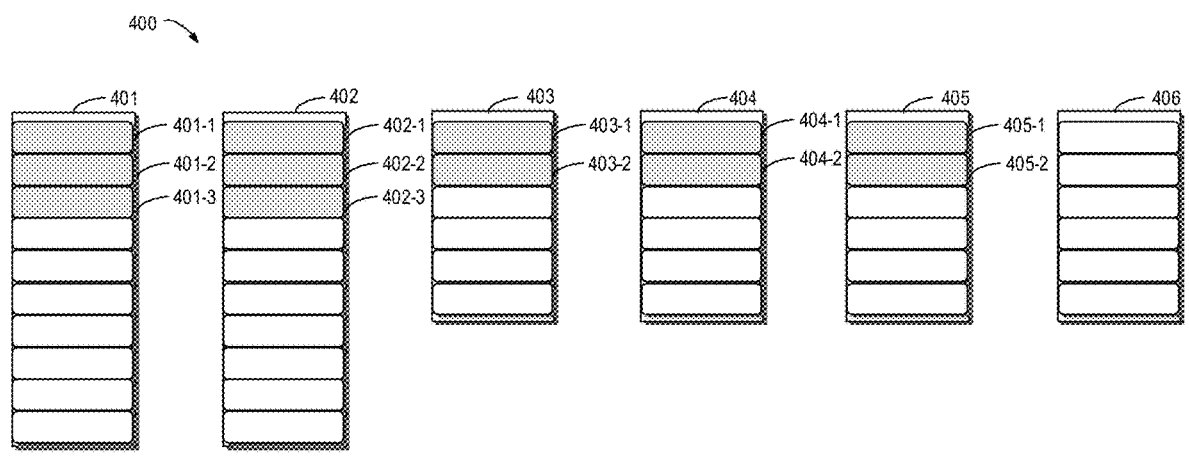
FIG. 4 illustrates a schematic diagram of an example 400 of the candidate disks in accordance with embodiments of the present disclosure.

FIG. 4 illustrates a schematic diagram of an example 400 of the candidate disks in accordance with embodiments of the present disclosure. As shown, when the width of the stripe of the disk array or the width of the disk array is 5, first 6 disks with the maximum physical disk slices are selected from the candidate disks, i.e., disk 401, disk 402, disk 403, disk 404, disk 405 and disk 406, wherein disks 401 to 405 act as disks in the set of disk arrays for storing data. The disk 406 serves as the preserved disk of the set of disk arrays, such that data on other disks are stored to the disk 406 when these disks are broken.

Disks 401 and 402 include 10 physical disk slices and disks 403 to 406 include 6 physical disk slices. Three disk arrays have been distributed over the selected disks. A first disk array with a width of 5 uses physical disk slice 401-1 in the disk 401, physical disk slice 420-1 in the disk 402, physical disk slice 403-1 in the disk 403, physical disk slice 404-1 in the disk 404 and physical disk slice 405-1 in the disk 405. A second disk array with a width of 5 uses physical disk slice 401-2 in the disk 401, physical disk slice 402-2 in the disk 402, physical disk slice 403-2 in the disk 403, physical disk slice 404-2 in the disk 404 and physical disk slice 405-2 in the disk 405. A third disk array with a width of 2 employs physical disk slice 401-3 in the disk 401 and physical disk slice 402-3 in the disk 402.

At 304, the management device 102 determines a width of a stripe where the used physical disk slices in the group of candidate disks are located. The management device 102 may obtain the metadata of each candidate disk in the group of candidate disks. The metadata is recorded with a disk array to which each physical disk slice belongs and the widths of stripes. For example, in FIG. 4, the obtained metadata of the disk 401 can be used to determine the widths of the stripes of the disk arrays to which the physical disk slices 401-1, 401-2 and 401-3 of the disk 401 belong.

At 306, the management device 102 determines, based on the decided width, a third number of physical disk slices not included in the set of disk arrays.

While determining whether the used physical disk slices have been included in the disk slices of the disk array set, the management device 102 needs to determine whether the total number of physical disk slices in the disk where the used physical disk slices are located is greater than the number of disk slices in the disk available for the set of disk arrays. If the total number of physical disk slices in the disk where the used physical disk slices are located is not greater than the number of disk slices in the disk available for the disk array set, the used physical disk slices act as the disk slices of the disk array set. If the total number of physical disk slices in the disk where the used physical disk slices are located is greater than the number of disk slices in the disk available for the disk array set, the management device 102 compares the determined width with the width of the disk array to be allocated.

When the width of the disk array is smaller than that of the disk array to be allocated, it is determined that the used physical disk slices are not included in the disk slices of the set of disk arrays. For example, if the number of physical disk slices in the disks 401 and 402 is 10 and the number of disk slices available for the set of disk arrays is 6, the total number of physical disk slices in the disks 401 and 402 is greater than the number of disk slices available for the set of disk arrays. The width of the stripe of the used physical disk slices 401-3 and 402-3 is 2, which is smaller than the width of the disk array to be allocated (i.e., 5). Therefore, the used physical disk slices 401-3 and 402-3 are not included in the disk slices of the set of disk arrays.

Alternatively or additionally, the maximum number of used physical disk slices on each disk not acting as the disk slices in the disk array set is equal to the total number of physical disk slices on each disk minus the number of disk slices available for the disk array set in the disk.

At 308, the management device 102 determines the second number based the number of used physical disk slices and the third number. In some embodiments, the management device 102 obtains the second number by the number of used physical disk slices minus the third number.

The above method can quickly determine the second number of physical disk slices in the used physical disk slices serving as the disk slices of the set of disk arrays, such that the number of used physical disk slices can be accurately determined with respect to different disk array sets, which ensures the accuracy of the utilization rate and increases the utilization rate of the candidate disks.

Figure 5:
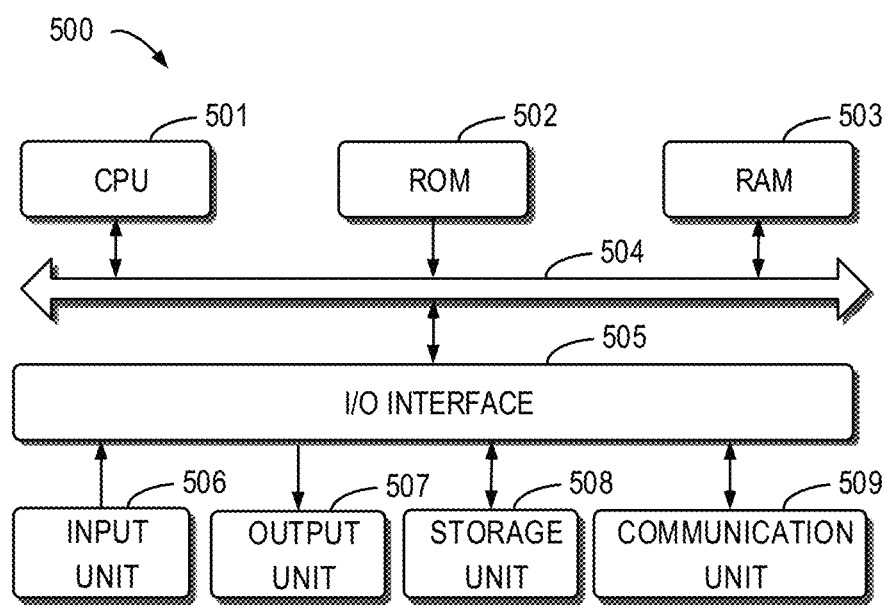
FIG. 5 illustrates a schematic block diagram of an example device 500 for implementing embodiments of the present disclosure.

FIG. 5 illustrates a schematic block diagram of an example device 500 for implementing embodiments of the present disclosure. For example, the management device 102 shown in FIG. 1 can be performed by the device 500. As shown, the device 500 includes a central processing unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as disk, optical disk etc.; and a communication unit 509, such as network card, modem, wireless transceiver and the like.

The communication unit 509 allows the device 500 to exchange information/data with other devices via the computer network, such as Internet, and/or various telecommunication networks.

The above described various procedures and processing, such as methods 200 and 300, can be executed by the processing unit 501. For example, in some embodiments, methods 200 and 300 can be implemented as computer software programs tangibly included in the machine-readable medium, such as storage unit 508. In some embodiments, the computer program can be partially or fully loaded and/or mounted to the device 500 via ROM 502 and/or communication unit 509. When the computer program is loaded to RAM 503 and executed by the CPU 501, one or more actions of the above described methods 200 and 300 can be executed.

The present disclosure can be method, apparatus, system and/or computer program product. The computer program product can include a computer-readable storage medium loaded with computer-readable program instructions for executing various aspects of the present disclosure.

The computer-readable storage medium can be a tangible apparatus that maintains and stores instructions utilized by the instruction executing apparatuses. The computer-readable storage medium can be, but not limited to, electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code includes one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable others of ordinary skill in the art to understand embodiments of the present disclosure.

We claim:

1. A method of managing disk arrays, comprising:
   determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks;
   determining, based on the width of the stripe and the total number, a first number of physical disk slices in the candidate disks that are available as disk slices of the set of disk arrays;
   determining, based on the number of the used physical disk slices, a second number of physical disk slices in the used physical disk slices that are available as disk slices of the set of disk arrays; and
   determining, based on the first number and the second number, utilization rates of the candidate disks for the allocation for the new disk array; and
   in response to determining that the utilization rates are lower than a threshold utilization rate, sending an indication for allocating the new disk array to the set of disk arrays in the candidate disks to allocate the new disk array.

2. The method of claim 1, wherein determining the first number comprises:
   sorting the candidate disks based on the total number of physical disk slices in each candidate disk; and
   determining, based on the width of the stripe, the first number of physical disk slices in the sorted candidate disks that are available as disk slices of the set of disk arrays.

3. The method of claim 1, wherein determining the second number comprises:
   determining, from the candidate disks, a group of candidate disks, wherein a total number of the group of candidate disks being greater than the width of the stripe;
   determining a width of the stripe where the used physical disk slices in the group of candidate disks are located;
   determining, based on the determined width, a third number of physical disk slices not included in the set of disk arrays; and
   determining the second number based on the number of the used physical disk slices and the third number.

4. The method of claim 1, wherein determining the width of the stripe and the metadata comprises:
   receiving a request for allocating the new disk array to the set of disk arrays, the request including an identification of the set of disk arrays;
   obtaining, based on the identification, a first device type corresponding to the set of disk arrays;
   obtaining the metadata associated with the candidate disks, the metadata further comprising a second device type related to the candidate disks; and
   in response to the first device type matching with the second device type, determining the width of the stripe.

5. An electronic device comprising:
   a processor; and
   a memory storing computer program instructions, the processor running the computer program instructions in the memory to control the electronic device to perform acts consisting:
     determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks;
     determining, based on the width of the stripe and the total number, a first number of physical disk slices in the candidate disks that are available as disk slices of the set of disk arrays;
     determining, based on the number of the used physical disk slices, a second number of physical disk slices in the used physical disk slices that are available as disk slices of the set of disk arrays;
     determining, based on the first number and the second number, utilization rates of the candidate disks for the allocation for the new disk array; and
     in response to determining that the utilization rates are lower than a threshold utilization rate, sending an indication for allocating the new disk array to the set of disk arrays in the candidate disks to allocate the new disk array.

6. The electronic device of claim 5, wherein determining the first number comprises:
   sorting the candidate disks based on the total number of physical disk slices in each candidate disk; and
   determining, based on the width of the stripe, the first number of physical disk slices in the sorted candidate disks that are available as disk slices of the set of disk arrays.

7. The electronic device of claim 5, wherein determining the second number comprises:
- determining, from the candidate disks, a group of candidate disks, wherein a total number of the group of candidate disks being greater than the width of the stripe;
- determining a width of the stripe where the used physical disk slices in the group of candidate disks are located;
- determining, based on the determined width, a third number of physical disk slices not included in the set of disk arrays; and
- determining the second number based on the number of the used physical disk slices and the third number.

8. The electronic device of claim 5, wherein determining the width of the stripe and the metadata comprises:
- receiving a request for allocating the new disk array to the set of disk arrays, the request including an identification of the set of disk arrays;
- obtaining, based on the identification, a first device type corresponding to the set of disk arrays;
- obtaining the metadata associated with the candidate disks, the metadata further comprising a second device type related to the candidate disks; and
- in response to the first device type matching with the second device type, determining the width of the stripe.

9. A computer program product having a non-transitory computer readable medium which stores a set of instructions to manage disk arrays; the set of instructions, when carried out by computerized circuitry, causing the computerized circuitry to perform a method of:
- determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks;
- determining, based on the width of the stripe and the total number, a first number of physical disk slices in the candidate disks that are available as disk slices of the set of disk arrays;
- determining, based on the number of the used physical disk slices, a second number of physical disk slices in the used physical disk slices that are available as disk slices of the set of disk arrays; and
- determining, based on the first number and the second number, utilization rates of the candidate disks for the allocation for the new disk array; and
- in response to determining that the utilization rates are lower than a threshold utilization rate, sending an indication for allocating the new disk array to the set of disk arrays in the candidate disks to allocate the new disk array.

10. The method of claim 1, wherein the set of disk arrays reside within a storage device; and
- wherein sending the indication includes:
  - providing the indication from a management device to the storage device to effectuate allocating of the new disk array to the set of disk arrays.

11. The electronic device of claim 5, wherein the set of disk arrays reside within a storage device;
- wherein the processor resides within a management device; and
- wherein sending the indication includes:
  - providing the indication from the management device to the storage device to effectuate allocating of the new disk array to the set of disk arrays.

12. The computer program product of claim 9, wherein determining the first number comprises:
- sorting the candidate disks based on the total number of physical disk slices in each candidate disk; and
- determining, based on the width of the stripe, the first number of physical disk slices in the sorted candidate disks that are available as disk slices of the set of disk arrays.

13. The computer program product of claim 9, wherein determining the second number comprises:
- determining, from the candidate disks, a group of candidate disks, wherein a total number of the group of candidate disks being greater than the width of the stripe;
- determining a width of the stripe where the used physical disk slices in the group of candidate disks are located;
- determining, based on the determined width, a third number of physical disk slices not included in the set of disk arrays; and
- determining the second number based on the number of the used physical disk slices and the third number.

14. The computer program product of claim 9, wherein determining the width of the stripe and the metadata comprises:
- receiving a request for allocating the new disk array to the set of disk arrays, the request including an identification of the set of disk arrays;
- obtaining, based on the identification, a first device type corresponding to the set of disk arrays;
- obtaining the metadata associated with the candidate disks, the metadata further comprising a second device type related to the candidate disks; and
- in response to the first device type matching with the second device type, determining the width of the stripe.

15. The computer program product of claim 9, wherein the set of disk arrays reside within a storage device; and
- wherein sending the indication includes:
  - providing the indication from a management device to the storage device to effectuate allocating of the new disk array to the set of disk arrays.

16. A method of managing disk arrays, comprising:
- determining a width of a stripe of a disk array in a set of disk arrays and metadata of candidate disks available for allocating a new disk array to the set of disk arrays, the metadata indicating a total number of physical disk slices in each of the candidate disks and a number of used physical disk slices in the candidate disks;
- determining, based on the width of the stripe and the total number, a first number of physical disk slices in the candidate disks that are available as disk slices of the set of disk arrays;
- determining, based on the number of the used physical disk slices, a second number of physical disk slices in the used physical disk slices that are available as disk slices of the set of disk arrays; and
- determining, based on the first number and the second number, utilization rates of the candidate disks for the allocation for the new disk array;

wherein determining the width of the stripe and the metadata comprises:
- receiving a request for allocating the new disk array to the set of disk arrays, the request including an identification of the set of disk arrays;
- obtaining, based on the identification, a first device type corresponding to the set of disk arrays;

obtaining the metadata associated with the candidate disks, the metadata further comprising a second device type related to the candidate disks; and in response to the first device type matching with the second device type, determining the width of the stripe.

17. The method of claim 16, wherein determining the first number comprises:

sorting the candidate disks based on the total number of physical disk slices in each candidate disk; and determining, based on the width of the stripe, the first number of physical disk slices in the sorted candidate disks that are available as disk slices of the set of disk arrays.

18. The method of claim 16, wherein determining the second number comprises:

determining, from the candidate disks, a group of candidate disks, wherein a total number of the group of candidate disks being greater than the width of the stripe;

determining a width of the stripe where the used physical disk slices in the group of candidate disks are located;

determining, based on the determined width, a third number of physical disk slices not included in the set of disk arrays; and determining the second number based on the number of the used physical disk slices and the third number.

* * * * *